(12) United States Patent
Dong et al.

(10) Patent No.: US 11,120,099 B2
(45) Date of Patent: Sep. 14, 2021

(54) RENDERING A WEB ELEMENT IN A WEB PAGE

(71) Applicant: International Business Machines Corporation, Armonk, NY (US)

(72) Inventors: Na Dong, Beijing (CN); David L. Kaminsky, Chapel Hill, NC (US); Yun Li Li, Beijing (CN); Xi Ning Wang, Beijing (CN); Rui Yin, Beijing (CN)

(73) Assignee: International Business machines Corporation, Armonk, NY (US)

( * ) Notice: Subject to any disclaimer, the term of this patent is extended or adjusted under 35 U.S.C. 154(b) by 842 days.

(21) Appl. No.: 14/665,486

(22) Filed: Mar. 23, 2015

(65) Prior Publication Data
US 2015/0310123 A1 Oct. 29, 2015

(30) Foreign Application Priority Data

Apr. 25, 2014 (CN) .......................... 201410171675.2

(51) Int. Cl.
*G06F 17/00* (2019.01)
*G06F 16/958* (2019.01)
*G06F 8/33* (2018.01)

(52) U.S. Cl.
CPC .............. *G06F 16/972* (2019.01); *G06F 8/33* (2013.01)

(58) Field of Classification Search
CPC .................................. G06F 8/33; G06F 16/972
See application file for complete search history.

(56) References Cited

U.S. PATENT DOCUMENTS

| 7,284,193 | B1 * | 10/2007 | Lindhorst | G06F 16/986 |
| | | | | 715/234 |
| 8,250,457 | B2 | 8/2012 | Fainberg et al. | |
| 8,434,002 | B1 | 4/2013 | Shah et al. | |
| 9,778,919 | B2 * | 10/2017 | Kusmer | G06F 8/34 |
| 2003/0217076 | A1 * | 11/2003 | Heptinstall | G06F 16/9577 |
| 2005/0010910 | A1 * | 1/2005 | Lindhorst | G06F 8/20 |
| | | | | 717/139 |
| 2006/2464360 | | 11/2006 | Ryuzo et al. | |

(Continued)

FOREIGN PATENT DOCUMENTS

CN 1869980 A 11/2006
CN 101937446 A 1/2011

(Continued)

OTHER PUBLICATIONS

Mickens, James, "Silo: Exploiting JavaScript and DOM Storage for Faster Page Loads", Microsoft Research, pp. 1-12, Jun. 2010, <https://www.usenix.org/legacy/event/webapps10/tech/full_papers/Mickens.pdf>.

(Continued)

*Primary Examiner* — Laurie A Ries
(74) *Attorney, Agent, or Firm* — David K. Mattheis; Maeve M. Carpenter

(57) ABSTRACT

Rendering a web element in a web page in an integrated development environment is provided. A reference address is extracted from code of a web page. The reference address references a web element. The web element is obtained based on the reference address and in response to the reference address indicating that the web element is an embedded web element. The web element is added to a resource pool. The web element of the resource pool is rendered in the web page.

20 Claims, 6 Drawing Sheets

(56) References Cited

U.S. PATENT DOCUMENTS

| | | | |
|---|---|---|---|
| 2009/0002381 A1* | 1/2009 | Harper | G06T 11/206 345/522 |
| 2010/0269094 A1* | 10/2010 | Levenshteyn | G06F 8/20 717/109 |
| 2011/0055314 A1* | 3/2011 | Rosenstein | H04L 67/34 709/203 |
| 2012/0036457 A1* | 2/2012 | Perlman | G06F 8/71 715/760 |
| 2012/0110437 A1 | 5/2012 | Pan et al. | |
| 2012/0221932 A1 | 8/2012 | Gleadall et al. | |
| 2012/0254835 A1* | 10/2012 | Muddu | G06F 8/36 717/121 |
| 2013/0007671 A1* | 1/2013 | Hammontree | G06F 17/30716 715/853 |
| 2013/0013859 A1 | 1/2013 | Zhu et al. | |
| 2013/0275853 A1 | 10/2013 | Eidson et al. | |
| 2014/0033019 A1 | 1/2014 | Zhang et al. | |
| 2014/0136944 A1* | 5/2014 | Harris | G06F 40/103 715/234 |
| 2014/0297589 A1* | 10/2014 | Chen | G06F 17/30 707/624 |
| 2015/0019991 A1* | 1/2015 | Kristj Nsson | H04L 41/0853 715/747 |

FOREIGN PATENT DOCUMENTS

| | | |
|---|---|---|
| CN | 102004729 A | 4/2011 |
| EP | 1533373 A1 | 5/2005 |
| JP | 2004000018 A | 1/2004 |
| WO | 03097830 A1 | 11/2003 |
| WO | 2012160499 A1 | 11/2012 |

OTHER PUBLICATIONS

Karri, Ramya, "Client-side Page Element Web-Caching", May 2009, San Jose State University, Master's Theses and Graduate Research, Page iv, © 2009, Ramya Karri, <http://scholarworks.sjsu.edu/cgi/viewcontent.cgi? article=1136&context=etd_projects&sei-redir=1&referer=http%3A%2F%2Fscholar.google.co.in%2Fscholar%3Fstart%3D30%26q%3Dimproving%2Brendering%2Bcaching%2Bweb%2BOR%2BCSS%2Belements%2Bin%2Bwebpage%2Beditor%2Bin%2Bintegrated%2Bdevelopment%26hl%3Den%26as_sdt%3D0%2C5#search=%22improving%.

* cited by examiner

RENDERING A WEB ELEMENT IN A WEB PAGE

TECHNICAL FIELD

The present invention relates generally to the field of generating web pages and, more specifically, to a method and apparatus for rendering a web element in a web page in a locally installed integrated development environment (IDE) while editing the web page.

BACKGROUND OF THE INVENTION

In the fields of computer technology and Internet technology, a large number of websites have emerged on the Internet, and various website editors have been developed for assisting developers in generating websites. For example, developers may use these editors to generate hierarchies of websites, layouts of web pages, and add various web elements to web pages (e.g., text, images, JavaScript resources, cascading style sheets (CSS), etc.).

While developing a website, developers desire to preview, in real time, the appearance of a web page being edited, so as to adjust the layout of the web page at any time and further increase the work efficiency. However, although existing website editors can display some web elements in web pages in real time, the display efficiency is far from satisfactory, and in particular, there might be a long latency for large cascading style sheets. In addition, since reference addresses of some types of web elements are dynamically generated when the web elements are accessed, and developers cannot ascertain real addresses of physical locations pointing to these web elements when editing web pages, these types of web elements cannot be displayed when web pages are being edited.

SUMMARY

According to one embodiment of the present invention, a method for rendering a web element in a web page in an integrated development environment is provided. The method includes, the method comprising: extracting, by one or more processors, a reference address from code of a web page, wherein the reference address references a web element; obtaining, by one or more processors, the web element based on the reference address and in response to the reference address indicating that the web element is an embedded web element; adding, by one or more processors, the web element to a resource pool; and rendering, by one or more processors, the web element of the resource pool in the web page.

According to another embodiment of the present invention, an apparatus for rendering a web element in a web page in an integrated development environment is provided. The apparatus comprises: an extracting module configured to extract a reference address from code of a web page, wherein the reference address references a web element; an obtaining module configured to obtain the web element based on the reference address and in response to the reference address indicating that the web element is an embedded web element; an adding module configured to add the web element to a resource pool; and a rendering module configured to render the web element of the resource pool in the web page.

According to another embodiment of the present invention, a computer program product for rendering a web element in a web page in an integrated development environment is provided. The computer program product comprises a computer readable storage medium and program instructions stored on the computer readable storage medium. The program instructions include program instructions to program instructions to extract a reference address from code of a web page, wherein the reference address references a web element; program instructions to obtain the web element based on the reference address and in response to the reference address indicating that the web element is an embedded web element; program instructions to add the web element to a resource pool; and program instructions to render the web element of the resource pool in the web page.

DETAILED DESCRIPTION

Figure 1:
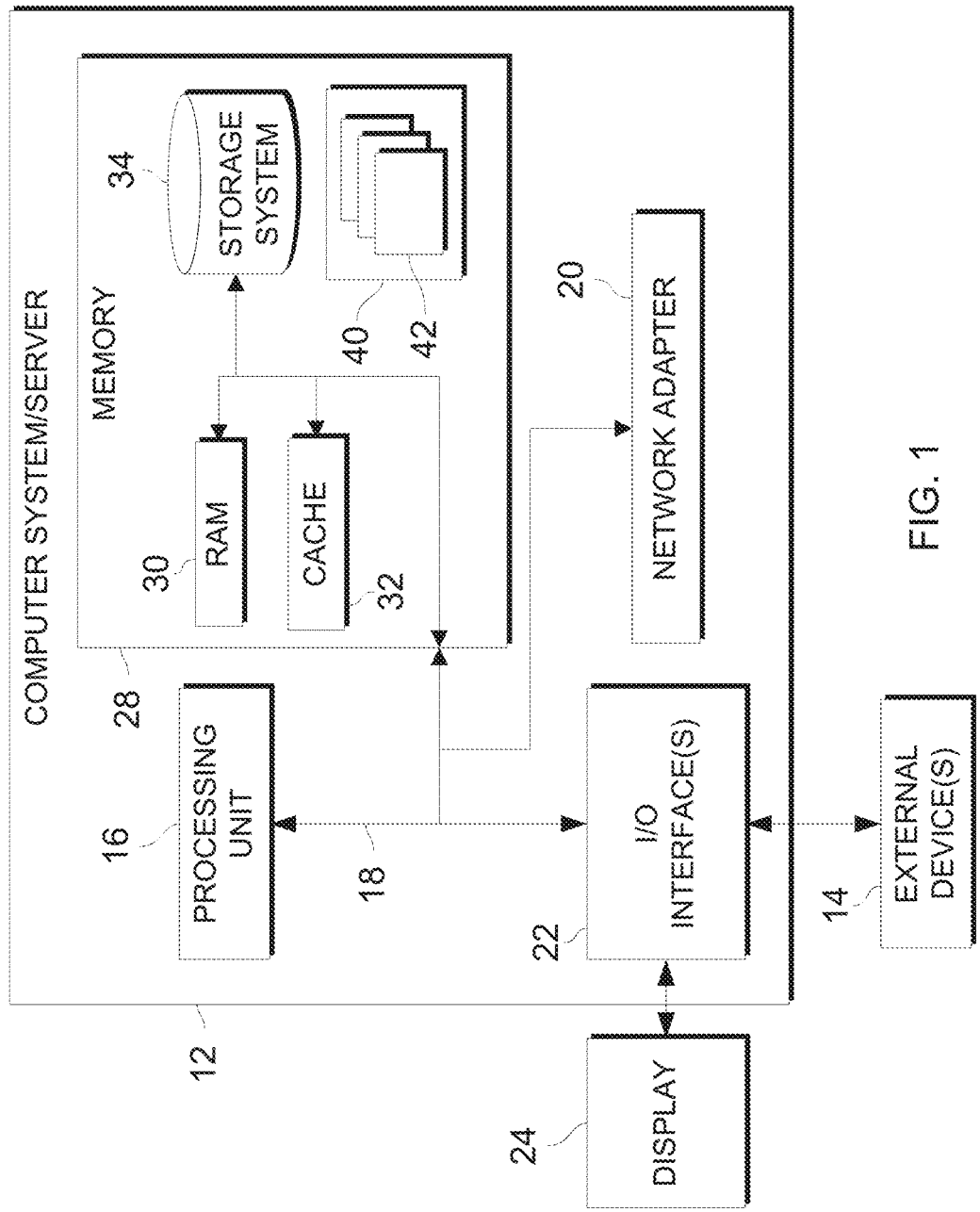
FIG. 1 is a block diagram of components of a computing device executing operations for rendering a web element in a web page, in accordance with an embodiment of the present invention.

Embodiments of the present invention recognize a need to display dynamically and in real time a web page being edited by developers and to further enhance an editor's capability of rendering the web page, in a locally installed integrated development environment when editing the web page.

Embodiments of the present invention recognize that it is desired to develop a technical solution capable of displaying, dynamically and in real time, a web page while the web page is being edited by a developer, and it is desired that the technical solution can display all types of web elements in the web page with a low latency and further enhance the development efficiency of developers, while trying not to change architecture of existing editors.

According to one aspect of the present invention, there is provided a method for rendering a web element in a web page in an integrated development environment during the editing of the web page, the method comprising: extracting from code of the web page a reference address pointing to the web element; obtaining the web element by using the reference address in response to the reference address indicating the web element is an embedded web element; adding the obtained web element to a resource pool; and rendering the web element in the web page in response to the web element existing in the resource pool.

In one embodiment of the present invention, the adding the obtained web element to the resource pool comprises:

copying the web element to the resource pool; and adding an association relationship between the reference address and the web element to an association relationship table, wherein the association relationship table describes an association relationship between the reference address in the code of the web page and a web element in the resource pool.

In one embodiment of the present invention, the obtaining the web element by using the reference address in response to the reference address indicating the web element is an embedded web element comprises: obtaining the web element by using the reference address based on a project of the web page, the project at least comprising the code contained in the web page and at least one web element associated with the web page.

In one embodiment of the present invention, the web element is obtained by using the reference address based on a project of the web page and comprises: during editing of the web page, deploying the project to a web page controller, on which the web page will be hosted after being edited; and retrieving the web element from the web page controller based on the reference address and contextual information of the web page controller.

According to one aspect of the present invention, there is provided an apparatus for rendering a web element in a web page in an integrated development environment during editing of the web page, comprising: an extracting module configured to extract from code of the web page a reference address pointing to the web element; an obtaining module configured to obtain the web element by using the reference address in response to the reference address indicating the web element is an embedded web element; an adding module configured to add the obtained web element to a resource pool; and a rendering module configured to render the web element in the web page in response to the web element existing in the resource pool.

In one embodiment of the present invention, the adding module comprises: a copying module configured to copy the web element to the resource pool; and a relationship adding module configured to add an association relationship between the reference address and the web element to an association relationship table, wherein the association relationship table describes an association relationship between the reference address in the code of the web page and a web element in the resource pool.

In one embodiment of the present invention, the obtaining module comprises: an element obtaining module configured to obtain the web element by using the reference address based on a project of the web page, the project at least comprising the code of the web page and at least one web element associated with the web page.

In one embodiment of the present invention, the element obtaining module comprises: a deploying module configured to, during editing of the web page, deploy the project to a web page controller, on which the web page will be hosted after being edited; and a second retrieving module configured to retrieve the web element from the web page controller based on the reference address and contextual information of the web page controller.

As provided by embodiments of the present invention, a web page being edited by developers may be displayed dynamically and in real time during editing of the web page. Some embodiments of the present invention may help enhance the development efficiency of developers.

Embodiments will be described in more detail with reference to the accompanying drawings, in which the embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with: one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the context of the present disclosure, implementing embodiments of the present invention will be described in the context of an integrated development environment. The integrated development environment is an application for providing a program development environment, and normally consists of a code editor, a compiler, a debugger, and GUI tools. The website editor described in the present disclosure is one example of the integrated development environment. Technical solutions according to various embodiments of the present invention may be implemented by extending functions of existing website editors.

WYSIWYG (What You See Is What You Get) capabilities provided by a current web editor depend on the editor's implementation mechanism, whereas the mechanism for rendering web elements in the editor's GUI differs from that in the browser. This will result in that the rendering capability in the web editor is different than the page's actual rendering effect in the browser.

Figure 2A:
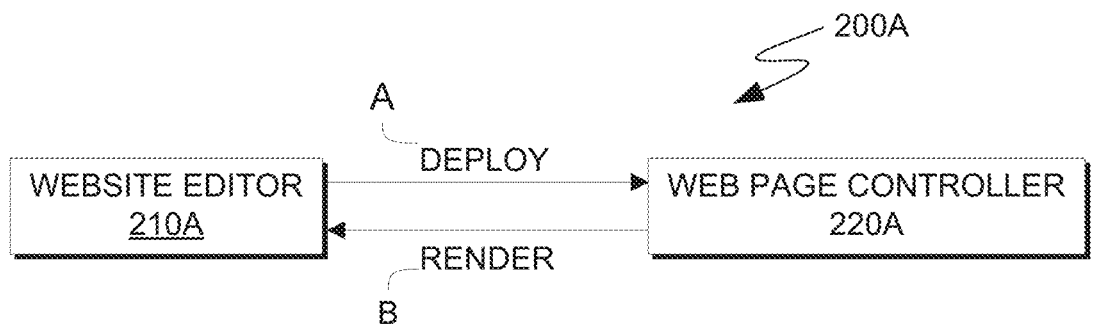
FIG. 2A and FIG. 2B respectively depict is a schematic view of generating a web page and an example interface during editing a web page, in accordance with embodiments of the present invention.

FIG. 2A shows a schematic view 200A of generating a web page according to one technical solution. As shown in this FIG. 2A, a website developed by developers needs to be deployed to a web page controller 220A (as shown by arrow A) so as to be rendered by a rendering module in a website editor 210A (as shown by arrow B). In an example shown in FIG. 2A, developers use editor 210A to edit various pages in the website. Some web elements referenced in code of a web page might not reside locally relative to website editor 210A, or local web elements might not be found for reasons like path matching; as a result, while editing a web page, developers cannot preview each web element in the web page being edited, let alone the overall view of the web page.

Figure 2B:
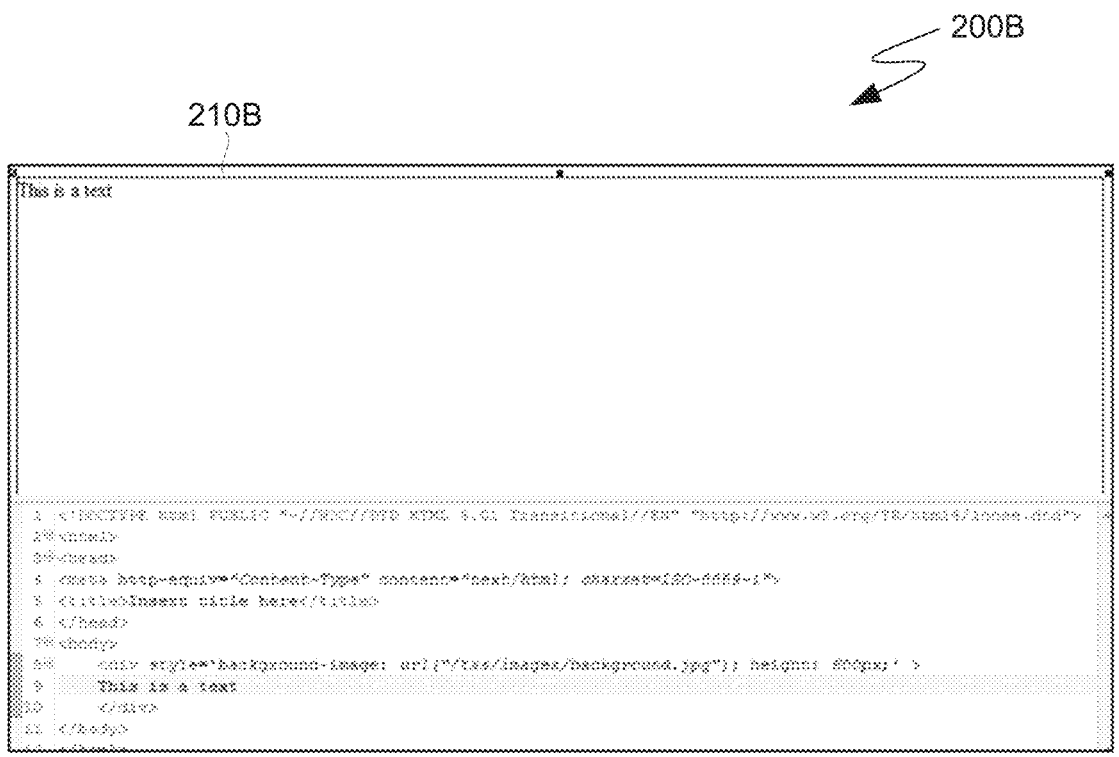

FIG. 2B shows a schematic view 200B of an interface when editing a web page according to one technical solution. As shown in FIG. 2B, there exist following lines in code of a web page being edited by a user:
<div style='background-image: url("/txs/images/background.jpg"); height: 600px;'>This is a test</div>

Due to the limitation of existing website editors, a background image defined by "/txs/images/background.jpg" cannot be displayed in the editor's preview interface 210B (FIG. 2B). Instead, only text can be displayed in the editor's preview interface 210B. Note although web elements displayed correctly can be viewed using the browser after the website edited by developers is deployed to the web page controller, current editors cannot display contents in the web page in real time.

Figure 3:
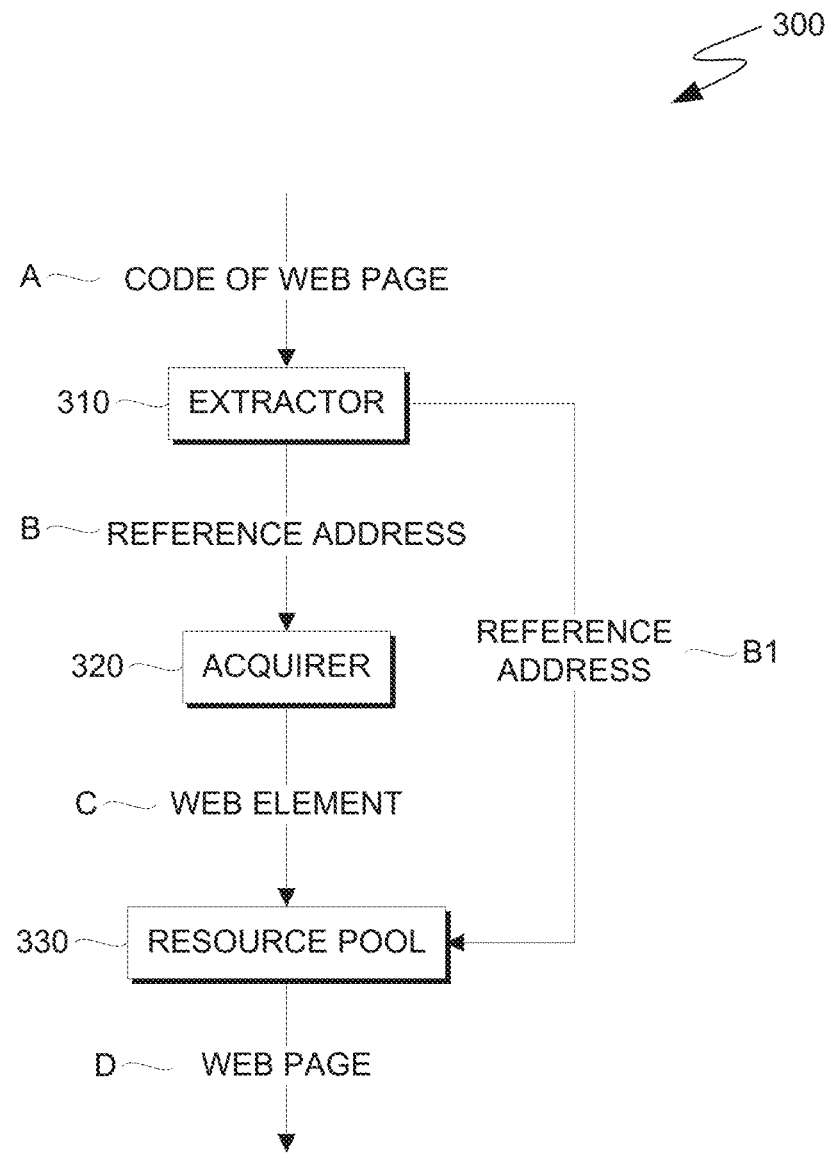
FIG. 3 is an architecture diagram of a technical solution for rendering a web element in a web page, in accordance with an embodiment of the present invention.

Therefore, various embodiments of the present invention provide a technical solution capable of displaying, dynamically and in real time, a web page being edited by developers when editing the web page. FIG. 3 schematically shows an architecture diagram 300 of a technical solution for rendering a web element in a web page according to one embodiment of the present invention.

As shown in FIG. 3, embodiments of the present invention provide a technical solution for rendering a web element in a web page. In this technical solution, web elements involved in a web page being edited currently may be cached by setting a resource pool, and when loading code of the web page, first a web element in the current web page referenced by a web page in the editor is copied to the resource pool so that the web page being edited currently is allowed to be previewed correctly in the editor.

Specifically, first, an extractor 310 extracts from code of a web page being edited a reference address pointing to a web element (as shown by arrow B). For example, extractor 310 extracts the following code:
<div style='background-image: url("/txs/images/background.jpg"); height: 600px;'>This is a test</div>

When finding the lines involves an embedded web element (e.g., "/txs/images/background.jpg"), an acquirer 320 obtains the corresponding web element of the reference address based on the reference address (as shown by arrow C). Subsequently, the web element is added to a resource pool 330, so that a web element that could not be displayed is rendered in the web page based on various web elements in resource pool 330. According to one embodiment of the present invention, when finding a to-be-displayed web element already exists in resource pool 330 (as shown by arrow B1), the web element can be obtained from resource pool 330 directly based on the reference address, and further the web element is displayed in the web page (as shown by arrow D).

Specifically, various embodiments of the present invention provide a method for rendering a web element in a web page in an integrated development environment during editing of the web page, comprising: extracting from code of the web page a reference address pointing to the web element; obtaining the web element by using the reference address in response to the reference address indicating the web element is an embedded web element; adding the obtained web element to a resource pool; and rendering the web element in the web page in response to the web element existing in the resource pool.

Figure 4:
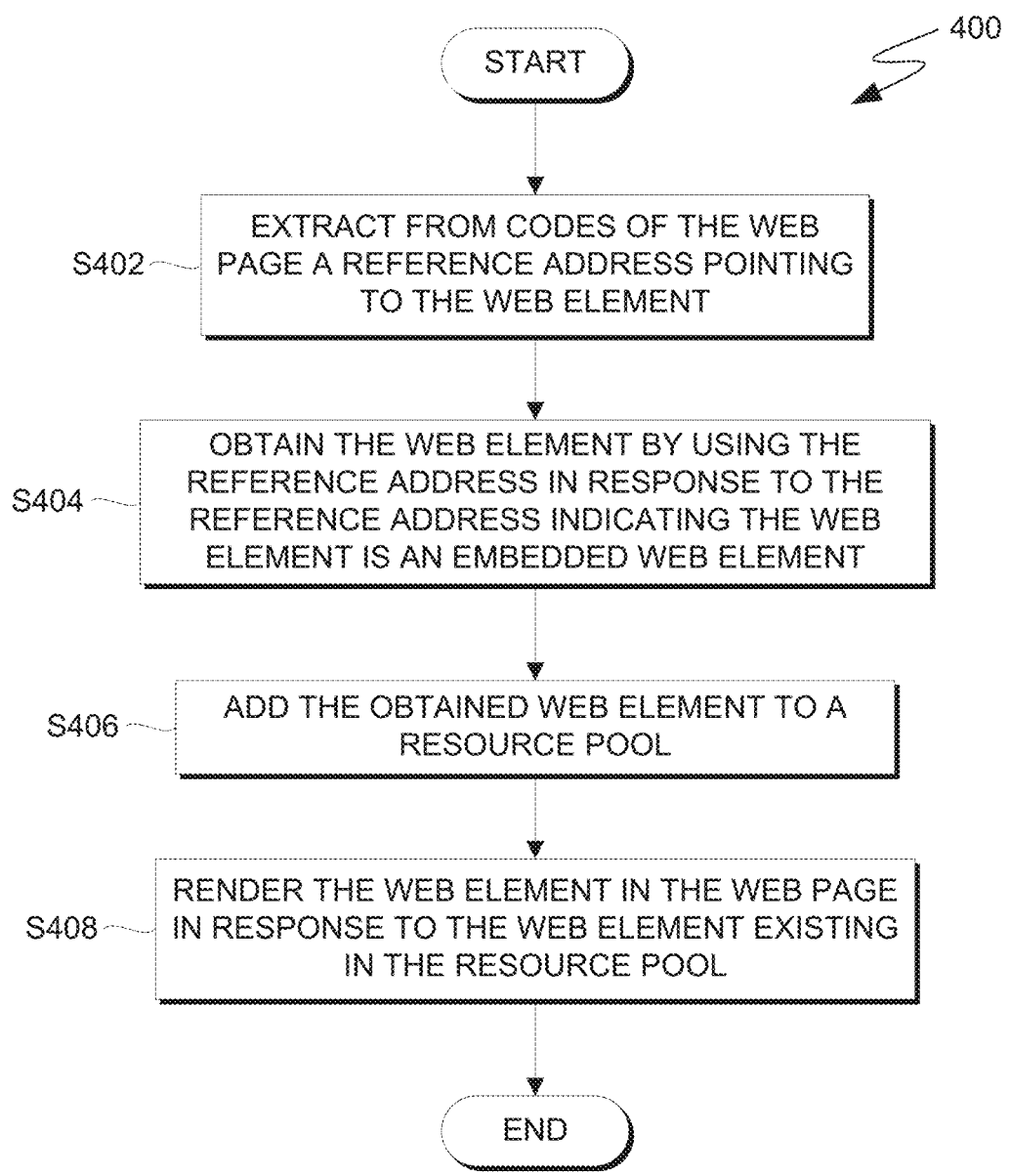
FIG. 4 is a flowchart of operations for rendering a web element in a web page, in accordance with an embodiment of the present invention.

FIG. 4 is a flowchart of operations 400 for rendering a web element in a web page, in accordance with an embodiment of the present invention. Specifically, in step S402, a reference address pointing to the web element is extracted from code of the web page. The reference address pointing to the web element may be extracted by parsing code of the web page. For example, the reference address may be extracted by analyzing a keyword in code of the web page. Those of ordinary skill in the art would recognize that the reference address may be extracted by other manners that are not detailed here.

In step S404, in response to the reference address indicating the web element is an embedded web element, the web element is obtained using the reference address. In some embodiments of the present invention, processing may be performed on only those web elements which cannot be displayed using a conventional website editor, while for web elements which can be displayed using a conventional website editor, existing approaches may still be used. In this manner, modifications to existing website editors may be reduced to as much as possible.

In step S406, the obtained web element is added to a resource pool. In this embodiment, the meaning of "adding" is to copy the obtained web element to the resource pool. In this manner, there is a duplicate of the web element in the resource pool, so during a preview the web element is rendered directly based on the web element's duplicate in the resource pool. By keeping in the resource pool a duplicate of a web element that could not be displayed originally, the embodiments of the present invention provide to-be-displayed content. In this embodiment, the resource pool may be located at the website editor locally, or at another physical location accessible via a network. Preferably, to increase the preview efficiency, the resource pool may be located in a memory or storage of a computing device implementing the method of the present invention.

In step S408, in response to the web element existing in the resource pool, the web element is rendered in the web page. In this embodiment, the web element in the resource pool may be called directly to be displayed in the web page. By means of the above method, the web page being edited by developers may be displayed dynamically and in real time during editing of the web page, thereby increasing the development efficiency of developers.

In the embodiment depicted by FIG. 4, step S408 is executed after step S406. However, in other embodiments, step S408 may be executed before or concurrently with step S406. For example, a web element obtained in step S404 may be directly displayed in the web page based on the web element, after which the web element may be added to the resource pool. In another example, an obtained web element may be added to the resource pool while rendering the web element in the web page.

Figure 5:
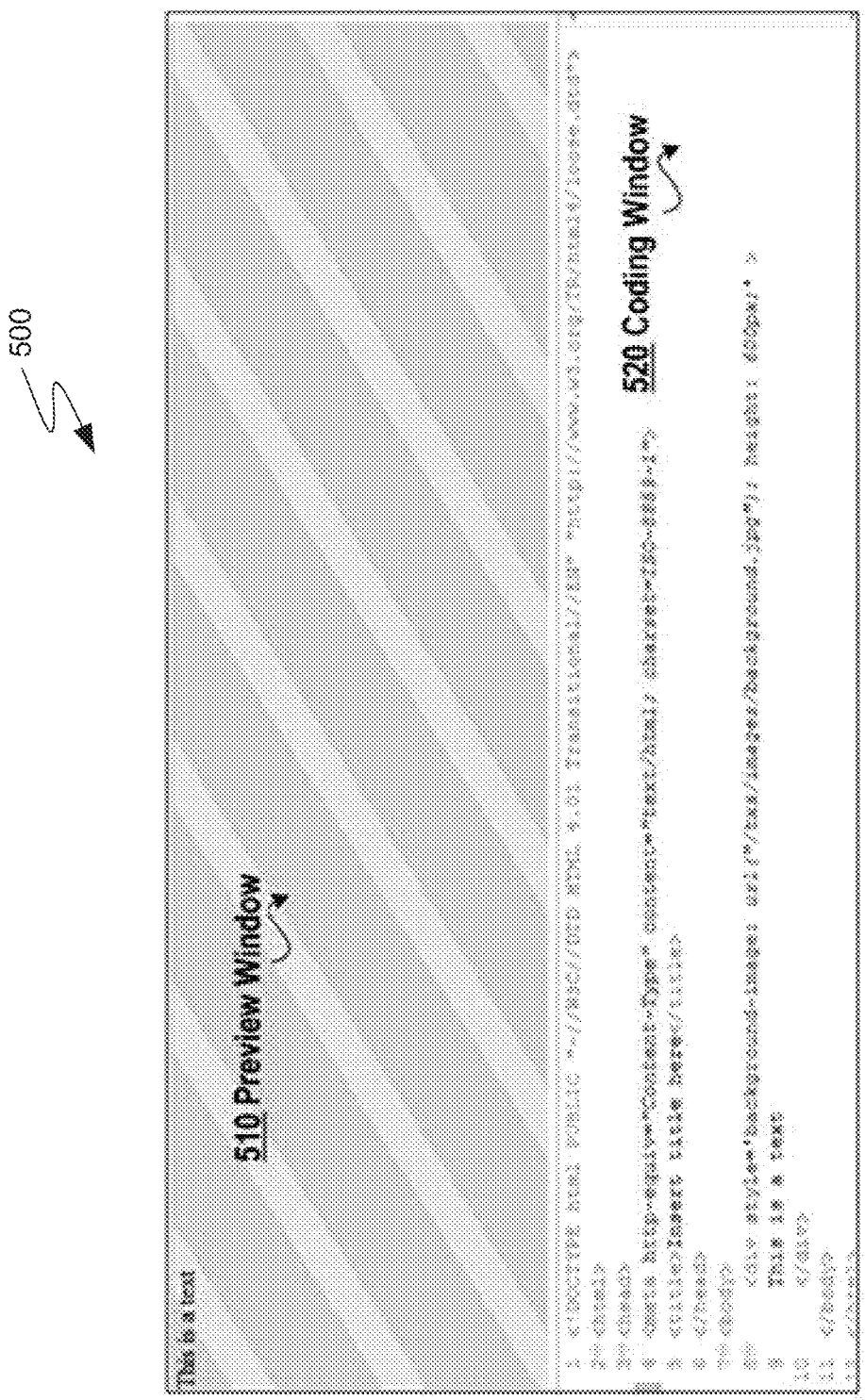
FIG. 5 is an example graphical user interface, in accordance with an embodiment of the present invention.

FIG. 5 is an example graphical user interface 500, in accordance with an embodiment of the present invention. Graphical user interface 500 may display a web page being edited by developers dynamically and in real time during editing of the web page. In the example shown in FIG. 5, the upper part of the interface is preview window 510, which displays effects of the web page being edited at the interface's upper part. The lower part of the interface is coding window 520, which displays code of the web page. A background image may be displayed in preview window 510, according to embodiments of the present invention.

FIG. 5 shows just an example of a graphical user interface for implementing at least one embodiment of the present invention. Those skilled in the art may further adopt other interfaces according to a various implementations. For example, a button for toggling activation of a function according to the embodiments of the present invention may be added to the interface, or a "refresh" button may further be added to the interface, so that after the user modifies code of the web page, various steps of operations 400 are re-executed based on modified code and in turn the function of rendering the web page is refreshed.

In one embodiment of the present invention, the adding of the obtained web element to the resource pool comprises: copying the web element to the resource pool; and adding an association relationship between the reference address and the web element to an association relationship table, wherein the association relationship table describes an association relationship between the reference address in the code of the web page and a web element in the resource pool.

In one embodiment of the present invention, an association relationship table may be set to describe association relationships between reference addresses in the code of the web page and web elements in the resource pool. For example, the association relationship table may be implemented in a manner as shown in Table 1 below.

TABLE 1

Example of Association Relationship Table

| No. | Reference Address | Web Element |
|-----|-------------------|-------------|
| 1 | /transactions/transactions-grid.js | transactions-grid.js |
| 2 | /txs/transactions-grid.js | transactions-grid.js |
| ... | ... | ... |

Table 1 depicts an example implementation according to at least one embodiment. Those skilled in the art may further define a data structure of the association relationship table in various implementations, so long as association relationships between reference addresses in the code and web elements in the resource pool can be described. In some embodiments of the present invention, a plurality of reference addresses may correspond to one identical web element. For example, reference address No. 1 and reference address No. 2 in Table 1 both correspond to one identical web element (i.e., "transactions-grid.js").

In one embodiment of the present invention, there is further comprised: before rendering the web element in the web page, looking up the web element in the resource pool based on the reference address and the association relationship table.

Where an association relationship table has been built, a web element to which a given reference address points may be looked up in the resource pool based on the association relationship table. For example, if the association relationship table shown in Table 1 above has been built and a reference address "/txs/transactions-grid.js" is parsed from web page code <script type="text/javascript" src="/txs/transactions-grid.js">, then, as illustrated in Table 1, the reference address's corresponding web element "transactions-grid.js" already exists in the resource pool, so subsequent procedural steps may be executed.

In one embodiment of the present invention, the obtaining the web element by using the reference address in response to the reference address indicating the web element is an embedded web element comprises: obtaining the web element by using the reference address based on a project of the web page, the project at least comprising the code of the web page and at least one web element associated with the web page.

A detailed description is presented below describing how to obtain a web element based on a project associated with a web page. The project is a workspace for generating a website, and includes at least: code of a web page; and at least one web element associated with the web page. Suppose, for example, that developers are developing a shopping website. At this point, a project used for a shopping website may include, for example, various web pages in the shopping website and web elements referenced in those web pages, such as images, videos, JavaScript resources, CSS, etc. Then, web elements may be looked up in a corresponding project.

In one embodiment of the present invention, the obtaining the web element by using the reference address based on a project of the web page comprises: retrieving the web element in the at least one web element comprised in the project, based on the reference address. For example, suppose loaded web page code transactions.html contains a code segment as below:
<script type="text/javascript" src="/transactions/transactions-grid.js">
By parsing the code segment, a reference address "/transactions/transactions-grid.js" may be extracted therefrom. A web element to which the reference address points is "transactions-grid.js", which "transactions-grid.js" belongs to a JavaScript resource (i.e., the embedded web element in the present example). Therefore, the corresponding JavaScript resource may be obtained based on the reference address points "transactions-grid.js" in a subsequent step.

According to the project definition, suppose the JavaScript resource is under the same transactions directory as the web page transactions.html, then the corresponding JavaScript resource may be found according to the reference address directly. At this point, the transactions-grid.js file may be directly added to the resource pool, and an entry as below added to the association relationship table:

/transactions/transactions-grid.js<->transactions-grid.js

In this manner, when developers open the transactions.html file later, the transactions-grid.js object is already in the resource pool. As such, transactions-grid.js can be found in the resource pool directly based on the reference address "/transactions/transactions-grid.js" in web page code and rendered in the web page, without a need to obtain the web element from the project any more.

Figure 6:
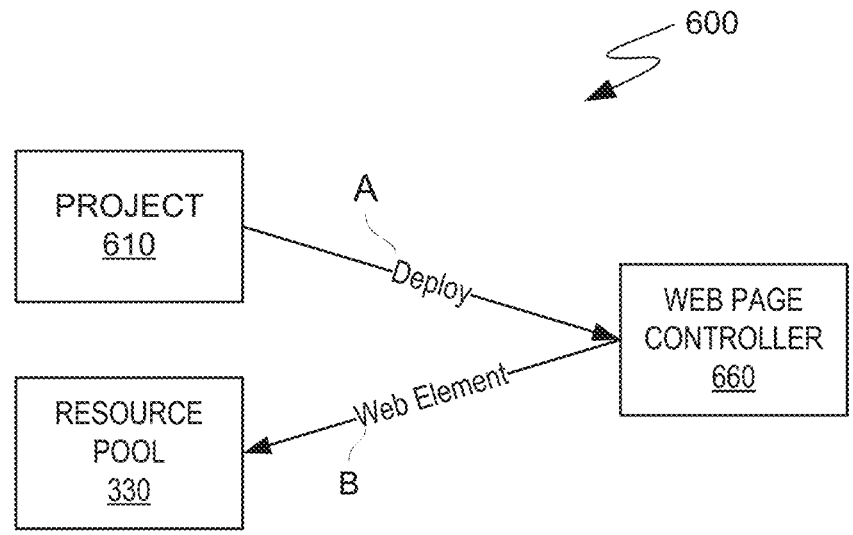
FIG. 6 is an architecture diagram of a technical solution for obtaining a web element based on a project of a web page, in accordance with one embodiment of the present invention.

The project does not necessarily comprise all web elements referenced in the web page. Therefore, in some cases, a physical location of the web element cannot be determined directly based on the reference address in code of the web page. Since code of a completed website are deployed to a web page controller, corresponding web elements may be unavailable for direct access based on some types of reference addresses in web page code. Generally speaking, such types of reference addresses further need to be combined with contextual information of the web page controller, whereby physical addresses for accessing corresponding web elements are obtained. With reference to FIG. 6, detailed description is presented below regarding how to obtain corresponding web elements based on contextual information of a web page controller. In this embodiment, the web page controller may be a component embedded into the website editor.

FIG. 6 is an architecture diagram, generally designated 600, of a technical solution for obtaining a web element based on a project of a web page, in accordance with one embodiment of the present invention. As shown by arrow A in FIG. 6, a project 610 may be deployed to a web page controller 660, and a corresponding web element is queried from the web page controller based on contextual information of the web page controller. Subsequently, the found web element may be added to resource pool 330 as shown by arrow B.

In the embodiment depicted in FIG. 6, web page controller 660 is shown in a separate block. However, the depicted embodiment is not intended to limit a physical location of web page controller 660. In the integrated development environment, web page controller 660 may be located on a computing device for implementing the embodiments of the present invention. In other words, to reduce the latency of network transmission and increase the work efficiency of developers, project 610, resource pool 330 and web page controller 660 may be located on the same computing device, or resource pool 330 deployed on a different computing device, or resource pool 330 may be shared among multiple developers when they develop jointly.

In one embodiment of the present invention, obtaining the web element by using the reference address based on a project of the web page comprises: during editing of the web page, deploying the project to a web page controller, on which the web page will be hosted after being edited; and retrieving the web element from the web page controller based on the reference address and contextual information of the web page controller.

In one embodiment of the present invention, the project further needs to be deployed to a web page controller, and later the web element is retrieved from the web page controller based on the reference address and contextual information of the web page controller.

In one embodiment, the retrieving the web element from the web page controller based on the reference address and contextual information of the web page controller comprises: mapping the reference address to a physical address of the web page controller based on the contextual information; and obtaining the web element from the web page controller based on the physical address. With reference to a concrete example, description is presented below as to implementation details.

For example, there exists the following code segment in file transactions.html of a web page:
<script type="text/javascript" src="/txs/transactions-grid.js">

By parsing the code segment, a reference address "/txs/transactions-grid.js" may be extracted therefrom. A web element to which the reference address points is "transactions-grid.js," and "transactions-grid.js" belongs to a JavaScript resource (i.e., the embedded web element in the present invention). However, the reference address is not a standard uniform resource locator (URL) that may be directly mapped to a physical path, so a "txs" file folder cannot be found under the same-level directory of file transactions.html of the web page, and further the JavaScript resource to which the reference address points cannot be located.

At this point, a project to which transactions.html belongs may be deployed at the web page controller end, and a path corresponding to the reference address is identified at the server end according to the request context. In this example, suppose the contextual information indicates the directory "txs" actually corresponds to the "transactions" directory of the web page controller, then based on the correspondence relationship indicated by the contextual information, the reference address (i.e., "/txs/transactions-grid.js") is mapped to an identifiable physical address (i.e., "/transactions/transactions-grid.js") of the web page controller.

Subsequently, a to-be-rendered element (i.e., transactions-grid.js) may be found based on the physical address, at which point the transactions-grid.js file may be loaded and added to the resource pool and a following entry added to the association relationship table:

/txs/transactions-grid.js<->transactions-grid.js

In this manner, later when developers open and edit the transactions.html file, since the transactions-grid.js object is already in the resource pool, transactions-grid.js may be found from the resource pool directly based on the reference address "/txs/transactions-grid.js" in the web page code and rendered in the web page, without a need to obtain the web element from the web page controller end.

In one embodiment of the present invention, the web element to which the reference address points may reside on a third-party server, rather than the corresponding project or the web page controller. At this point, although the web element on the third-party server may be accessed via the network, due to factors such as network latency, the preview efficiency is far from satisfactory. Therefore, when loading code of the web page, a corresponding web element may be obtained from a third-party server and added to the resource pool, so as to improve the preview efficiency.

For example, suppose there exists a code segment in file transactions.html of the loaded web page:
<script type="text/javascript" src="http://sample.com/txs/dojo.js">

By parsing the code segment, a reference address "http://sample.com/txs/dojo.js" may be extracted therefrom. A web element to which the reference address points is "dojo.js," and "dojo.js" belongs to a JavaScript resource (i.e., the embedded web element in the present invention). Since the reference address "http://sample.com/txs/dojo.js" is a directly accessible URL, the to-be-displayed web element may be obtained from a third-party server based on the URL. At this point, the dojo.js file may be directly added to the resource pool and a following entry added to the association relationship table:
http://sample.com/txs/dojo.js<->dojo.js In this manner, later when developers open and edit the transactions.html file, since the dojo.js object is already in the resource pool, dojo.js may be found from the resource pool directly based on the reference address "http://sample-.com/txs/dojo.js<->dojo.js" in the web page code and rendered in the web page, without a need to obtain the web element from the third-party server end.

In one embodiment of the present invention, the embedded web element is at least one of: a JavaScript resource, a cascading style sheet, an image, text, audio and video, although other elements are possible. Various embodiments of the present invention are intended to solve the problem that existing website editors cannot properly preview some types of web elements. Embodiments of the present invention recognize that the physical address of a JavaScript resource needs to be dynamically generated after a web page is deployed to a web page controller, and a cascading style sheet typically consists of a larger amount of data, so these two types of web elements cannot be displayed in real time in current website editors, or the display efficiency is extremely low. Therefore, embodiments of the present invention provide a technical solution with respect to JavaScript resources and cascading style sheets, so that a web page being edited by developers can be displayed dynamically and in real time during editing of the web page. Similarly, embodiments of the present invention may further be applied to a web elements such as an image, text, audio and video.

In one embodiment of the preset invention, there is further comprised: rendering the web element in the web page in response to the web element existing in the resource pool. By means of the above-described technical solution, a web element associated with a web page has been stored in the resource pool while loading the web page, so the web element in the resource pool can be directly rendered later.

In one embodiment of the present invention, in response to code of the web page being updated, operations may further be performed based on the updated web page using the above method.

Various embodiments implementing the method of the present invention have been described above with reference to the accompanying drawings. Those skilled in the art may understand that the method may be implemented in software, hardware or a combination of software and hardware. Moreover, those skilled in the art may understand by implementing steps in the above method in software, hardware or a combination of software and hardware, there may be provided an apparatus based on the same invention concept. Even if the apparatus has the same hardware structure as a general-purpose processing device, the functionality of software contained therein makes the apparatus manifest distinguishing properties from the general-purpose processing device, thereby forming an apparatus of the various embodiments of the present invention. The apparatus described in the present invention comprises several modules, the modules configured to execute corresponding steps. Upon reading this specification, those skilled in the art may understand how to write a program for implementing actions performed by these modules. Since the apparatus is based on the same invention concept as the method, the same or corresponding implementation details are also applicable to modules corresponding to the method. As detailed and complete description has been presented above, the apparatus is not detailed below.

Figure 7:
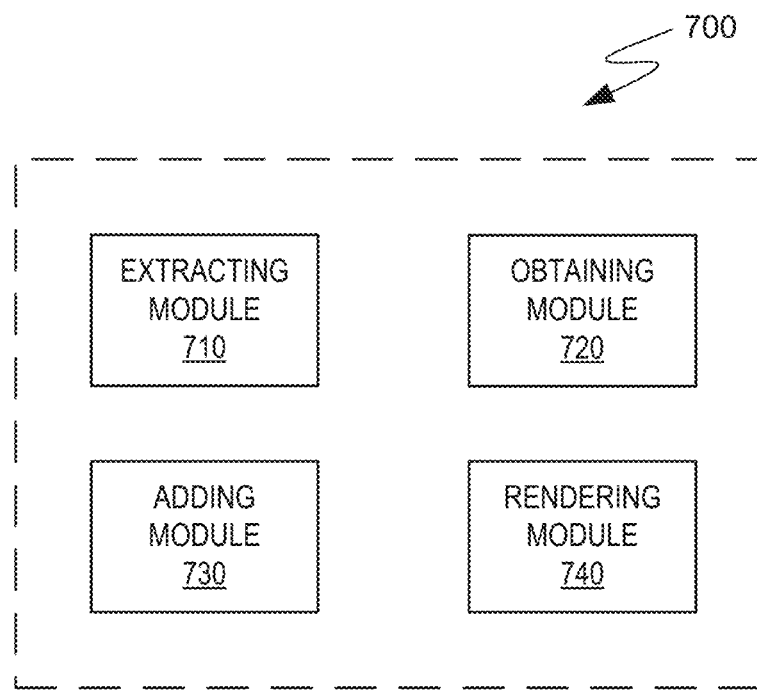
FIG. 7 is a block diagram of an apparatus for rendering a web element in a web page, in accordance with one embodiment of the present invention.

FIG. 7 is a block diagram, generally designated 700, of an apparatus for rendering a web element in a web page, in accordance with one embodiment of the present invention. Specifically, there is provided an apparatus for rendering a web element in a web page in an integrated development environment during editing of the web page, comprising: an extracting module 710 configured to extract from code of the web page a reference address pointing to the web element; an obtaining module 720 configured to obtain the web element by using the reference address in response to the reference address indicating the web element is an embedded web element; an adding module 730 configured to add the obtained web element to a resource pool; and a rendering module 740 configured to render the web element in the web page in response to the web element existing in the resource pool.

In one embodiment of the present invention, adding module 730 comprises: a copying module configured to copy the web element to the resource pool; and a relationship adding module configured to add an association relationship between the reference address and the web element to an association relationship table, wherein the association relationship table describes an association relationship between the reference address in the code of the web page and a web element in the resource pool.

In one embodiment of the present invention, there is further comprised: a lookup module configured to, before rendering the web element in the web page, identify the web element in the resource pool based on the reference address and the association relationship table.

In one embodiment of the present invention, obtaining module 710 comprises: an element obtaining module configured to obtain the web element by using the reference address based on a project of the web page, the project at least comprising the code of the web page and at least one web element associated with the web page.

In one embodiment of the present invention, the element obtaining module comprises: a first retrieving module configured to retrieve the web element in the at least one web element comprised in the project, based on the reference address.

In one embodiment of the present invention, the element obtaining module comprises: a deploying module configured to, during editing of the web page, deploy the project to a web page controller, on which the web page will be hosted after being edited; and a second retrieving module configured to retrieve the web element from the web page controller based on the reference address and contextual information of the web page controller.

In one embodiment, the second retrieving module comprises: a mapping module configured to map the reference address to a physical address of the web page controller based on the contextual information; and a web element obtaining module configured to obtain the web element from the web page controller based on the physical address.

In one embodiment of the present invention, the embedded web element is at least one of: a JavaScript resource and a cascading style sheet.

In one embodiment of the present invention, there is further comprised: a second rendering module configured to render the web element in the web page in response to the web element existing in the resource pool.

Embodiments of the present invention provide a technical solution capable of displaying a web page being edited by a developer dynamically and in real time, during editing of the web page. Embodiment provide for displaying all types of web elements in the web page with a low latency and further enhance the development efficiency of developers, while aiming to minimize changes to the architecture of existing editors.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for rendering a web element in a web page in an integrated development environment (IDE), the method comprising:
   in response to editing a webpage of a project within an IDE, determining, by one or more computer processors, that a rendered display of the webpage within the IDE lacks display of a web element included in the code of the webpage as compared to the rendered display of the webpage within a web browser and deployed to a web page controller;
   extracting, by one or more processors, one or more reference addresses from the code of the webpage, wherein a first reference address corresponds to a first web element;
   determining, by one or more processors, that the first reference address associated with the first web element of the webpage is not associated with a corresponding physical address;
   in response to determining that the first reference address associated with the first web element of the webpage is not associated with a corresponding physical address, deploying, by one or more computer processors, the project to the web page controller;
   obtaining, by one or more processors, from the web page controller, a physical address for the first web element that includes contextual information of the web page controller;
   adding, by one or more processors, an association relationship between the first reference address and the obtained physical address, including the contextual information of the web page controller, corresponding to the first web element, to an association relationship table; and
   rendering, by one or more processors, within the IDE, the webpage utilizing the first web element, based on identifying the first reference address having an association relationship with the obtained physical address corresponding to the first web element within the association relationship table.

2. The method of claim 1, further comprising:
   copying, by one or more processors, to the IDE, the web element based on the-physical address of the web element and further based on a project of the web page.

3. The method of claim 1, wherein the physical address of the web element is a uniform resource locator (URL), and wherein the URL is network accessible.

4. The method of claim 1, further comprising:
   identifying, by one or more computer processors, a second reference address within the code of the webpage that is associated with a second web element;
   obtaining, by one or more computer processors, the second web element based on a physical address associated with the second reference address;
   determining, by one or more computer processors, that the obtained second web element is comprised of programming code;
   parsing, by one or more computer processors, the obtained second web element to identify a physical address referencing an external web element; and
   rendering, by one or more processors, within the IDE, the webpage utilizing the external web element, based on the identified physical address referencing the external web element that is included in the programming code of the second web element.

5. The method of claim 1, further comprising:
   identifying, by one or more computer processors, a web element comprised of programming code;
   determining, by one or more computer processors, that the web element comprised of programming code includes code that dynamically generates addresses for one or more external web elements;
   in response to determining that the web element comprised of programming code includes code that dynamically generates addresses for one or more external web elements, deploying, by one or more computer processors, the project to a web page controller;
   obtaining, by one or more processors, from the web page controller, the dynamically generated addresses for one or more external web elements; and
   rendering, by one or more processors, within the IDE, the webpage utilizing the one or more external web elements, based on the web element comprised of programming code.

6. The method of claim 1, wherein the web element is comprised of programming code, and wherein the programming code is associated with an interpreted run-time language.

7. The method of claim 1, wherein another web element is comprised of programming code, and wherein the programming code is associated with a style sheet language.

8. A computer program product for rendering a web element in a web page in an integrated development environment (IDE), the computer program product comprising:
   a computer readable storage medium and program instructions stored on the computer readable storage medium, the program instructions comprising:
       program instructions to respond to editing a webpage of a project within an IDE, by determining that a rendered display of the webpage within the IDE lacks display of a web element included in code of the webpage as compared to the rendered display of the webpage within a web browser and deployed to a web page controller;
       program instruction to extract one or more reference addresses from the code of the webpage, wherein a first reference address corresponds to a first web element;

program instructions to determine that the first reference address associated with the first web element of the webpage is not associated with a corresponding physical address;
program instructions to respond to determining that the first reference address associated with the first web element of the webpage is not associated with the corresponding physical address by deploying the project to the web page controller;
program instructions to obtain, from the web page controller, a physical address for the first web element that includes contextual information of the web page controller;
program instructions to add an association relationship between the first reference address and the obtained physical address, including the contextual information of the web page controller, corresponding web element, to an association relationship table; and
program instructions to render, within the IDE, the web page utilizing the first web element, based on identifying the first reference address having an association relationship with the obtained physical address corresponding to the first web element within the association relationship table.

9. The computer program product of claim 8, further comprising:
program instructions to copy, to the IDE, the web element based on the-physical address of the web element and further based on a project of the web page.

10. The computer program product of claim 8, wherein the physical address of the web element is a uniform resource locator (URL), and wherein the URL is network accessible.

11. The computer program product of claim 8, further comprising:
program instructions to identify a second reference address within the code of the webpage that is associated with a second web element;
program instructions to obtain the second web element based on a physical address associated with the second reference address;
program instructions to determine that the obtained second web element is comprised of programming code;
program instructions to parse the obtained second web element to identify a physical address referencing an external web element; and
program instructions to render, within the IDE, the webpage utilizing the external web element, based on the identified physical address referencing the external web element that is included in the programming code of the second web element.

12. The computer program product of claim 8, further comprising:
program instructions to identify a web element comprised of programming code;
program instructions to determine that the web element comprised of programming code includes code that dynamically generates addresses for one or more external web elements;
program instructions to respond to determining that the web element comprised of programming code includes code that dynamically generates addresses for one or more external web elements by deploying the project to a web page controller;
program instructions to obtain from the web page controller, the dynamically generated addresses for one or more external web elements; and
program instructions to render within the IDE, the webpage utilizing the one or more external web elements, based on the web element comprised of programming code.

13. The computer program product of claim 8, wherein the web element is comprised of programming code, and wherein the programming code is associated with an interpreted run-time language.

14. The computer program product of claim 8, wherein another web element is comprised of programming code, and wherein the programming code is associated with a style sheet language.

15. The computer program product of claim 8, wherein the web element is comprised of programming code, and wherein the programming code is associated with an interpreted run-time language.

16. The computer program product of claim 8, wherein another web element is comprised of programming code, and wherein the programming code is associated with a style sheet language.

17. A computer system for rendering a web element in a web page in an integrated development environment (IDE), the computer system comprising:
one or more computer processors;
one or more computer readable storage media;
program instructions stored on the computer readable storage media for reading/execution by at least one of the one or more computer processors, the program instructions further comprising:
program instructions to respond to editing a webpage of a project within an IDE, by determining that a rendered display of the webpage within the IDE lacks display of a web element included in code of the webpage as compared to the rendered display of the webpage within a web browser and deployed to a web page controller;
program instruction to extract one or more reference addresses from the code of the webpage, wherein a first reference address corresponds to a first web element;
program instructions to determine that the first reference address associated with the first web element of the webpage is not associated with a corresponding physical address;
program instructions to respond to determining that the first reference address associated with the first web element of the webpage is not associated with the corresponding physical address by deploying the project to the web page controller;
program instructions to obtain, from the web page controller, a physical address for the first web element that includes contextual information of the web page controller;
program instructions to add an association relationship between the first reference address and the obtained physical address, including the contextual information of the web page controller, corresponding web element, to an association relationship table; and
program instructions to render, within the IDE, the web page utilizing the first web element, based on identifying the first reference address having an association relationship with the obtained physical address corresponding to the first web element within the association relationship table.

18. The computer system of claim 17, further comprising:
program instructions to copy, to the IDE, the web element based on the physical address of the web element and further based on a project of the web page.

19. The computer system of claim 17, further comprising:
program instructions to identify a second reference address within the code of the webpage that is associated with a second web element;
program instructions to obtain the second web element based on a physical address associated with the second reference address;
program instructions to determine that the obtained second web element is comprised of programming code;
program instructions to parse the obtained second web element to identify a physical address referencing an external web element; and
program instructions to render, within the IDE, the webpage utilizing the external web element, based on the identified physical address referencing the external web element that is included in the programming code of the second web element.

20. The computer system of claim 17, further comprising:
program instructions to identify a web element comprised of programming code;
program instructions to determine that the web element comprised of programming code includes code that dynamically generates addresses for one or more external web elements;
program instructions to respond to determining that the web element comprised of programming code includes code that dynamically generates addresses for one or more external web elements by deploying the project to a web page controller;
program instructions to obtain from the web page controller, the dynamically generated addresses for one or more external web elements; and
program instructions to render within the IDE, the webpage utilizing the one or more external web elements, based on the web element comprised of programming code.

* * * * *